United States Patent [19]
Egawa et al.

[11] Patent Number: 5,963,402
[45] Date of Patent: Oct. 5, 1999

[54] MAGNETIC HEAD AND METHOD FOR PRODUCING THE SAME

[75] Inventors: Motoji Egawa; Kazutoshi Takayanagi, both of Asabo-cho, Japan

[73] Assignee: Minebea Co., Ltd., Miyota, Japan

[21] Appl. No.: 09/150,667

[22] Filed: Sep. 10, 1998

Related U.S. Application Data

[63] Continuation of application No. 08/780,326, Jan. 8, 1997, abandoned.

[30] Foreign Application Priority Data

Jul. 19, 1996 [JP] Japan .................................. 8-209204

[51] Int. Cl.$^6$ ................................................. G11B 5/127
[52] U.S. Cl. ............................................................ 360/125
[58] Field of Search .............................. 29/603; 360/126, 360/103, 104, 124

[56] References Cited

U.S. PATENT DOCUMENTS

| | | | |
|---|---|---|---|
| 4,883,950 | 11/1989 | Chiba et al. | 360/121 |
| 5,459,629 | 10/1995 | Wakasugi | 360/104 |
| 5,497,283 | 3/1996 | Kato | 360/123 |
| 5,629,821 | 5/1997 | Wakasugi et al. | 360/125 |

FOREIGN PATENT DOCUMENTS 7-235013  9/1995  Japan .

Primary Examiner—Allen T. Cao
Attorney, Agent, or Firm—Oliff & Berridge, PLC

[57] ABSTRACT

To provide a magnetic head and a method for producing the same with a high dimension precision and a good shield effect, a cutaway 35 is formed by applying a machining process to a closure member 22, and first, second and third ribs 31, 32 and 33 of a back yoke base member 30 formed by molding, thereby obtaining a back yoke. A width of the first, second and third ribs 31, 32 and 33 is made large. There is no fear that the deformation or warpage would occur due to molding or sintering. As a result, it is possible to increase a height of first, second and third leg portions 19, 20 and 21. It is therefore possible to increase the desired reproduction output by increasing the number of turns of coils. It is possible to dispense with a gap formed on a bottom side of the back yoke, that has been required for extracting lead lines in the conventional manner. It is possible to simplify the shape of the back yoke not only to enhance the dimension precision but also to restrict the inflow of the magnetic field through the gap formed on the bottom side from the outside to thereby reduce the adverse affect of the external magnetic field.

1 Claim, 5 Drawing Sheets

MAGNETIC HEAD AND METHOD FOR PRODUCING THE SAME

This is a continuation of application Ser. No. 08/780,326 filed Jan. 8, 1997 now abandoned. The entire disclosure of the prior application is hereby incorporated by reference herein in its entirety.

BACKGROUND OF THE INVENTION

1. Field of the Invention

The present invention relates to a magnetic head used in a floppy disc drive (FDD) or the like.

2. Description of the Related Art

An example of a conventional magnetic head is shown in FIG. 6 (Japanese Laid-Open Patent No. Hei 7-235013).

In FIG. 6, the magnetic head 1 is mainly composed of a front core 2 which is slidably moved to a magnetic recording medium (not shown) on one side of the front core 2, a back yoke 3 made of a magnetic material such as Mn—Zn ferrite material, Ni—Zn ferrite material or the like adhered by adhesives such as epoxy resin or UV ray curing resin (UV resin) on the other side of the front core 2, a read-write coil 4 and erasing coil 5 to be fitted in the back yoke 3.

The front core 2 is mainly composed of a composite core 8 (core front member) forming a read-write gap 6 and erasing gap 7, and a first outrigger 9 and a second outrigger 10 which are adhered by epoxy resin or the like on both sides of the composite core 8 to be substantially in the form of a rectangular shape.

The composite core 8 is mainly composed of a first core member 11 having a read-write gap 6 on one side, and a second core member 12 to be bonded to the first core member 11 and having an erasing gap 7.

The first core member 11 is mainly composed of a first center core 13 made of magnetic material extending to the other side of the front core 2, and a read-write side core on the front side 14 made of magnetic material extending to the other side of the front core 2 and bonded to the first center core 13 through the read-write gap 6.

The second core member 12 is mainly composed of a second center core 15 made of magnetic material bonded to the first center core 13 and extending to the other side of the front core 2, and an erasing side core on the front side 16 made of magnetic material, extending to the other side of the front core 2 and bonded to the second center core 15 through the erasing gap 7. The second core member 12 is set at the same height of that of the first core member 11. Incidentally, in FIG. 6, reference numeral 17 denotes a glass for the purpose of magnetic insulation.

The first outrigger 9 is in the form of a plate with the same length as that of the composite core and is provided with a groove 18 extending in a longitudinal direction on one side. The second outrigger 10 is in the form of a rectangular parallelepiped shape with the same longitudinal length as that of the composite core 8.

The back yoke 3 is mainly composed of first, second and third leg portions 19, 20 and 21, a closure member 22 having substantially parallelepiped annular member for covering the erasing coil and the read-write coils 5 and 4 and a base plate 23 having a substantially rectangular shape and connected to the base end of the closure member 22 and to the base ends of the first, second and third leg portions 19, 20 and 21.

In this case, only side portions 23a and 23b of the base plate 23 confronting each other in a widthwise direction (hereinafter referred to as first and second side portions) are connected to the closure member 22 (the parts connected to the first and second side portions 23a and 23b will hereinafter be referred to the first and second side wall portions 22a and 22b). Gaps 24 and 24 are formed between in space of third and fourth side portions 23c and 23d perpendicular to the first and second side portions 23a and 23b, respectively, and in space of side wall portions 22c and 22d of the closure member 22 (hereinafter referred to as to third and fourth side wall portions, respectively), so that the lead lines 4a of the read-write coil 4 and lead lines 5a of the erasing coil 5 may be extracted to the outside therefrom. Also, the upper surface portion of the first side wall portion 22a is bonded to the first outrigger 9.

The first and second leg portions 19 and 20 are formed along the third and fourth side portions 23c and 23d and in confronting relation with each other. The third leg portion 21 is formed between the first and second leg portions 19 and 20. The read-write coil 4 and the erasing coil 5 are fitted to the first an second leg portions 19 and 20, respectively.

The first and second leg portions 19 and 20 are bonded to the read-write side core 14 and erasing side core 16 on the front side, respectively. And the third leg portion 21 is bonded to the first center core 13 and the second center core 15. Further, the first side wall portion 22a is bonded with the first outrigger 9. The epoxy resin or UV resin (ultraviolet ray curing resin) is used for adhesion so that the front core 2 and the back yoke 3 is formed in one body.

Then, as described above, the front core 2 and the back yoke 3 are formed in one body so that the read-write magnetic circuit (not identified by numeral) is formed of the first center core 13, the third leg portion 21, the base plate 23, the first leg portion 19, the read-write side core on the front side 14 and the read-write gap 6. Also, in the same manner, the erasing magnetic circuit (not identified by numeral) is formed of the second center core 15, the third leg portion 21, the base plate 23, the second leg portion 20, the erasing side core on the front side 16 and the erasing gap 7. Incidentally, the third leg portion 21 forms a common magnetic path of the read-write and the erasing magnetic circuit.

The lead lines 4a and 5a of the read-write and erasing coils 4 and 5 are inserted into the gaps 24 and 24 of the back yoke 3 and extracted to the outside.

Now, since the relative speed to the magnetic recording medium of the magnetic head used for the FDD is low, it is necessary to increase the number of turns of the coil for the purpose of obtaining the desired reproduction output. In order to increase the number of turns of the oil, it is necessary to thin and elongate the leg portions (first, second and third leg portions 19, 20 and 21) of the back yoke 3 within a range where its efficiency is not deteriorated.

On one hand, in case of a ferrite sintered material such as Mn—Zn, in order to enhance the formation precision, the amount of binder to be contained may be increased. According to the above, the containment rate of the magnetic material for a unit volume is reduced, which cause the magnetic reluctance to be increased.

On the other hand, when the amount of the binder to be contained is reduced, the mechanical strength after molding and before sintering is reduced, so that, there is a tendency that the damage of the sintered products is remarkable during the conveyor delivery in the production steps. For this reason, in the magnetic head 1 described in the above prior art of which the back yoke is made of the ferrite sintered material such as Mn—Zn, it is difficult to reduce a thickness of each of the leg portions in the back yoke 3 (first, second and third leg portions 19, 20 and 21) to a predetermined level, and to increase a length thereof beyond a predetermined level. Accordingly, it is impossible in practical to increase the number of the turns of the coil, so that the predetermined reproduction output is not obtained. Also, since the gaps 24 and 24 are formed on the bottom side of the back yoke 3 (in the space between the third side portion 23c and the third side wall portion 22c and the space between the fourth side portion 23d and the fourth side wall portion 22d), and the lead lines 4a and 5a of the read-write and erasing coils 4 and 5 can be inserted into the gaps 24 and 24 and extracted to the outside therefrom. However, by providing the gaps 24 and 24, the structure of the back yoke 3 is complicated. Therefore, when the ferrite such as Mn—Zn is molded and sintered in the above manner, not only is it difficult to obtain the predetermined dimension but also the magnetic flux of the external magnetic field is introduced from the gaps 24 and 24 formed on the bottom side of the back yoke 3 into the interior to thereby reduce the shield effect of the magnetic head 1.

SUMMARY OF THE INVENTION

In view of the foregoing defects, an object of the present invention is to provide a magnetic head and a method for producing the same, which may keep a good shielding effect with high precision.

According to a first aspect of the invention, there is provided a magnetic head comprising: a core front member having an operational gap, a slider having a front core by bonding integrally with said core front member, which is slidable on one side of the core front member to a magnetic recording medium, and a back yoke to be bonded on the other side of said front core to form a magnetic circuit together with said core front member corresponding to the operational gap;

wherein said back yoke includes leg portions inserting coils therein and forming a part of a magnetic path of the magnetic circuit with front end sides of said leg portions by being bonded to said core front member, a substantially annular closure member having at least part of front ends to be bonded to said front core for receiving the coils to be fitted to said leg portions, and a base plate to be bonded to a base end side of said closure member and base end sides of said leg portions so as to cover the base end side of said closure member;

wherein cutaways through which lead lines of the coils are passable are formed in said closure member in the vicinity of the leg portions.

According to a second aspect of the invention, there is provided a method for producing a magnetic head comprising: a core front member having an operational gap, a slider having a front core slidable on its one side to a magnetic recording medium by bonding integrally with said core front member; and a back yoke to be bonded to the other side of said front core to form a magnetic circuit together with said core front member corresponding to the operational gap, said method comprising the following steps of:

forming, by molding, a back yoke base member including ribs whose end sides are bonded to the core front member to form a part of a magnetic path of the magnetic circuit and which have leg portions to which coils are fitted, a substantially annular closure member having at least part of its tip end side to be bonded with said front core for confining the coils to be fitted in the leg portions, a base plate to be bonded to a base end side of said closure member and base end sides of said leg portions so as to cover the base end side of said closure member; and forming cutaways in said closure member and ribs along said core front member by applying a machining process to said back yoke base member to form the back yoke which is composed of a base plate, the leg portions and the closure member in which the cutaway are formed.

DESCRIPTION OF THE PREFERRED EMBODIMENTS

Figure 6:
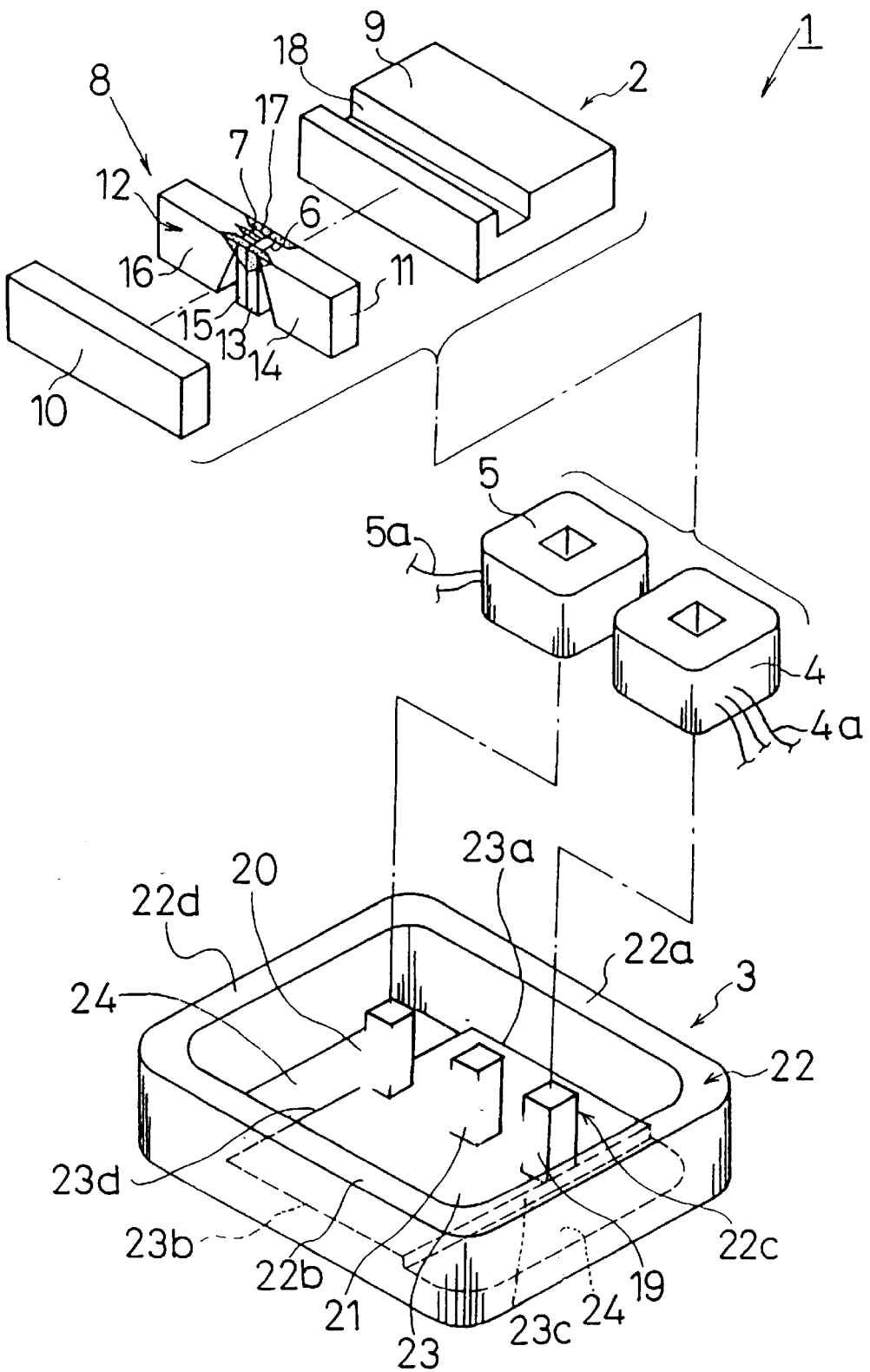
FIG. 6 is an exploded perspective view showing a magnetic head in accordance with an conventional example.

A magnetic head 1 according to a first embodiment of the present invention will now be described with reference to FIGS. 1 to 3 in which the same reference numerals as those in FIG. 6 are used to indicate the like components and members and duplicated explanation therefor will be omitted appropriately.

Figure 1:
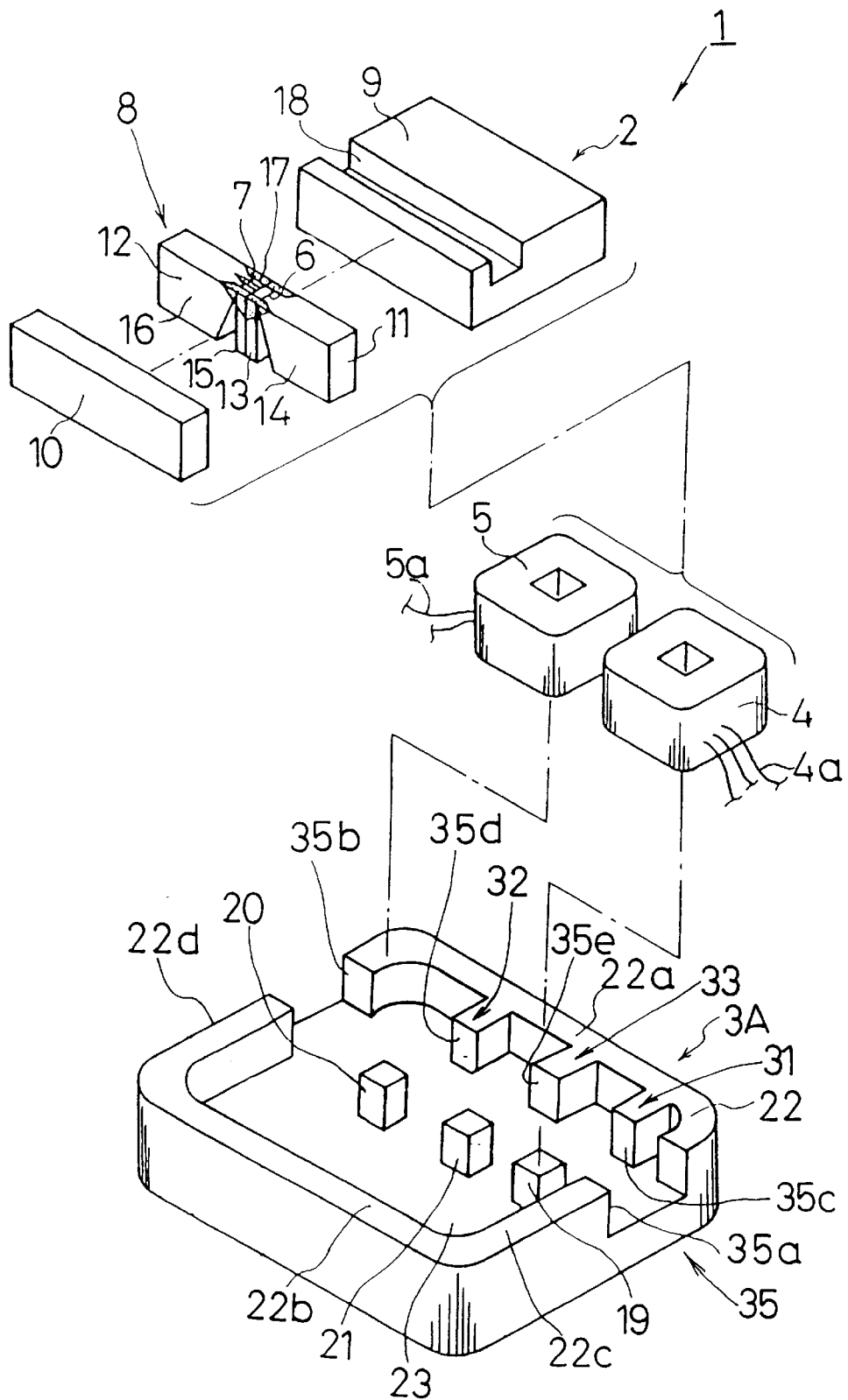
FIG. 1 is an exploded perspective view showing a magnetic head in accordance with a first embodiment of the present invention.

The difference between the magnetic head 1 described in the first embodiment of th- invention and that shown in FIG. 6 is that as shown in FIG. 1, a back yoke 3A is provided instead for the back yoke 3.

Figure 3:
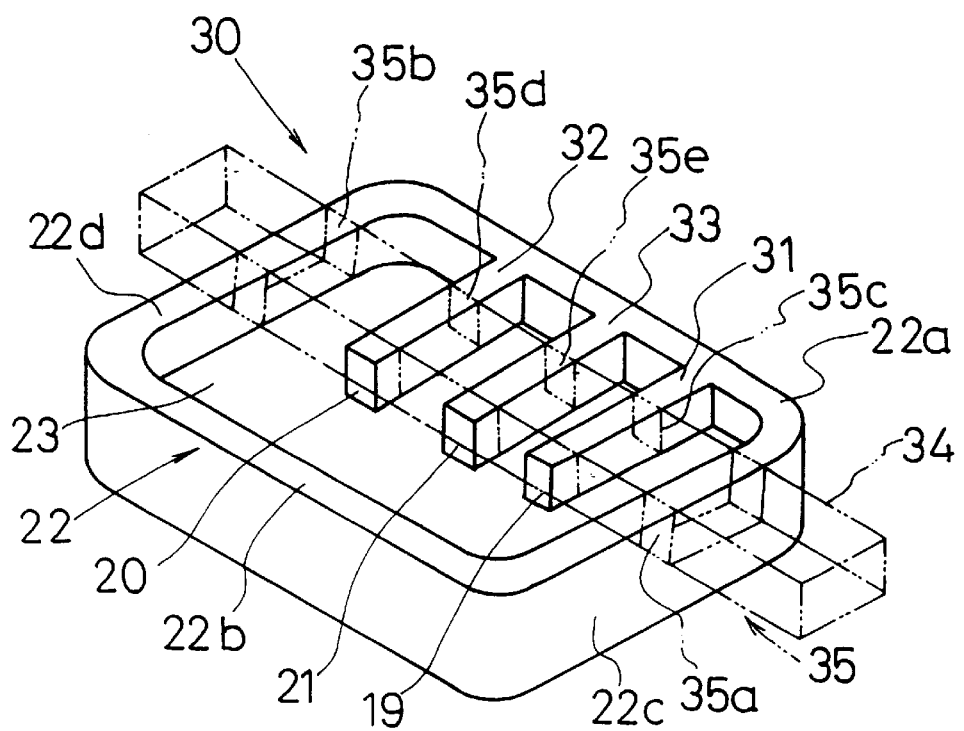
FIG. 3 is a perspective view showing a method for producing the back yoke of the magnetic head shown in FIG. 1.

The back yoke 3A is made of a back yoke base member 30 as shown in FIG. 3. The back yoke base member 30 is formed of magnetic material such as Mn—Zn ferrite or the like by molding (molding step) and sintering (sintering step). The back yoke member 30 is mainly composed of a substantially rectangular annular closure member 22, longitudinal first and second ribs 31 and 32 extending from a first side wall portion 22a toward a second side wall portion 22b of the closure member 22 and forming first and second leg portions 19 and 20 at their end portions, respectively, a third rib 33 located between the first and second ribs 31 and 32, extending from the first side wall portion 22a toward the second side wall portion 22b, and forming a third leg portion 21 at its end portion, and a substantially rectangular base plate 23 connected to the base end side of the closure member 22 and the base end sides of the first, second and third ribs 31, 32 and 33 so as to close the base end side of the closure member 22.

Subsequently, a machining process is applied to the back yoke base 30 formed through the molding treatment and the sintering treament as mentioned above, from a third side wall portion 22c or a fourth side wall portion 22d to the opposite side wall portion, by using a slicing or dicing machine so that the first, second and third leg portions 19, 20 and 21 are left (so as to be along the composite core 8 to be bonded together), that is, along the triangular parallelepiped shape indicated at two-dot-and-dash lines 34. And then, a cutaway 35 (each cutaway will be referred to 35a, 35b, 35c, 35d and 35e when applicable) is formed at the third side wall portion 22c, the fourth side wall portion 22d, and the first, second third ribs 31, 32 and 33. As a result, the back yoke 3A is formed, which is composed of the base plate 23, the first, second and third leg portions 19, 20 and 21, and the closure member 22 in which the cutaways 35a and 35b are formed.

Next, a read-write coil 4 and an erasing coil 5 are fitted to the first and second leg portions 19 and 20 of the above-described back yoke 3A. Lead lines 4a and 5a of the read-write coil 4 and the erasing coil 5 are extracted through the cutaways 35a and 35b to the outside.

Figure 2:
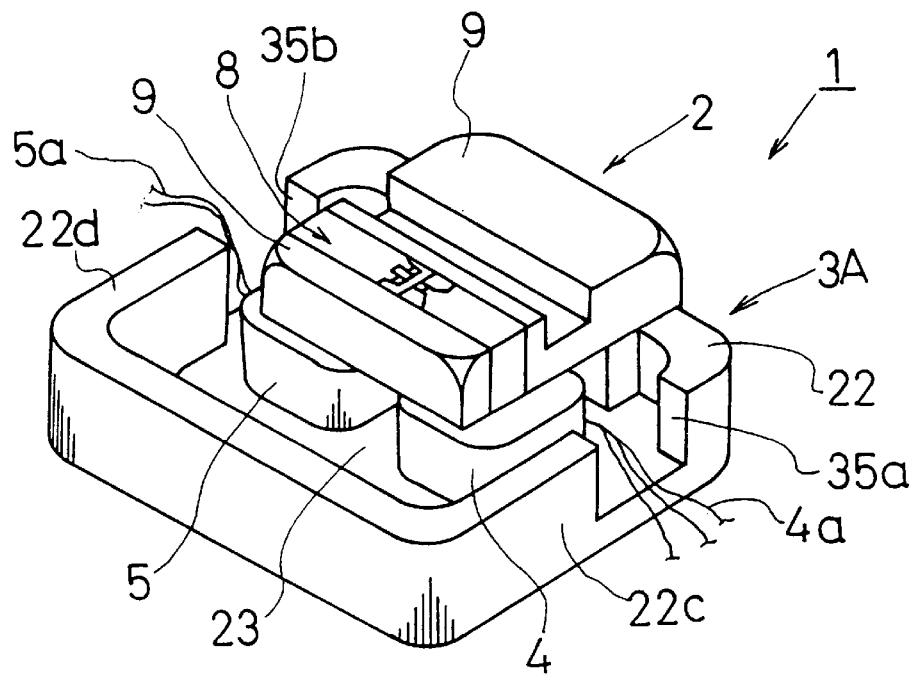
FIG. 2 is a perspective view showing an assembled state of the magnetic head shown in FIG. 1.

A front core 2 is bonded to the back yoke 3A provided with the read-write coil 4 and the erasing coil 5 by using epoxy resin or UV resin (i.e., ultraviolet ray curing resin) to thereby make the front core 2 and the back yoke 3 as one body to form the magnetic head 1 as shown in FIG. 2.

Incidentally, the tip ends of the lead lines 4a and 5a are connected to an external circuit such as an FPC (printed board, not shown).

In the above-described head 1, the first, second and third leg portions 19, 20 and 21 are formed of the elongated first, second and third ribs 31, 32 and 33 extending from the first side wall portion 22a toward the second side wall portion 22b of the closure member 22 during the molding step. And the widths of the first, second and third ribs 31, 32 and 33 are made large. Accordingly, these portions are hardly deformed or warped in molding or sintering. Due to the fact that the warpage or deformation would hardly occur, it is possible to increase the height of the first, second and third ribs 31, 32 and 33, and also, the height of the first, second and third leg portions 19, 20 and 21. Further, by increasing the height of the first, second and third leg portions 19, 20 and 21, it is possible to increase the number of turns of the coil (read-write coil 4, erasing coil 5) to obtain a desired reproduction output. Moreover, due to the fact that the warpage or deformation would hardly occur in sintering or molding, it is possible to reduce the amount of the binder to be contained during the molding step and to increase a rate of the magnetic material to obtain the back yoke 3A whose magnetic characteristics are superior and whose magnetic reluctance is low.

Furthermore, in order to finish the first, second and third leg portions 19, 20 and 21 by machining process such as dicing or slicing process after molding process, it is possible to enhance the dimension precision in comparison with the first, second and third leg portions 19, 20 and 21 that have been obtained only by molding. Finally, it is possible to reduce a clearance between the leg portions and the read-write coil 4 and the erasing coil 5.

Furthermore, since the lead lines 4a and 5a of the read-write coil 4 and the erasing coil 5 are extracted through the cutaways 35a and 35b formed at the third and fourth side wall portions 22c and 22d of the closure member 22, it is possible to dispense with a gap formed on the bottom side of the back yoke 3a, which has been required for extracting the lead lines 4a and 5a in the prior art. For this reason, it is possible to simplify the shape of the back yoke 3A not only to enhance the dimension precision but also to reduce the inflow of the magnetic field through the gap on the bottom side of the back yoke from the outside. Corresponding to this, it is possible to reduce the adverse affect of the external magnetic field.

Figure 4:
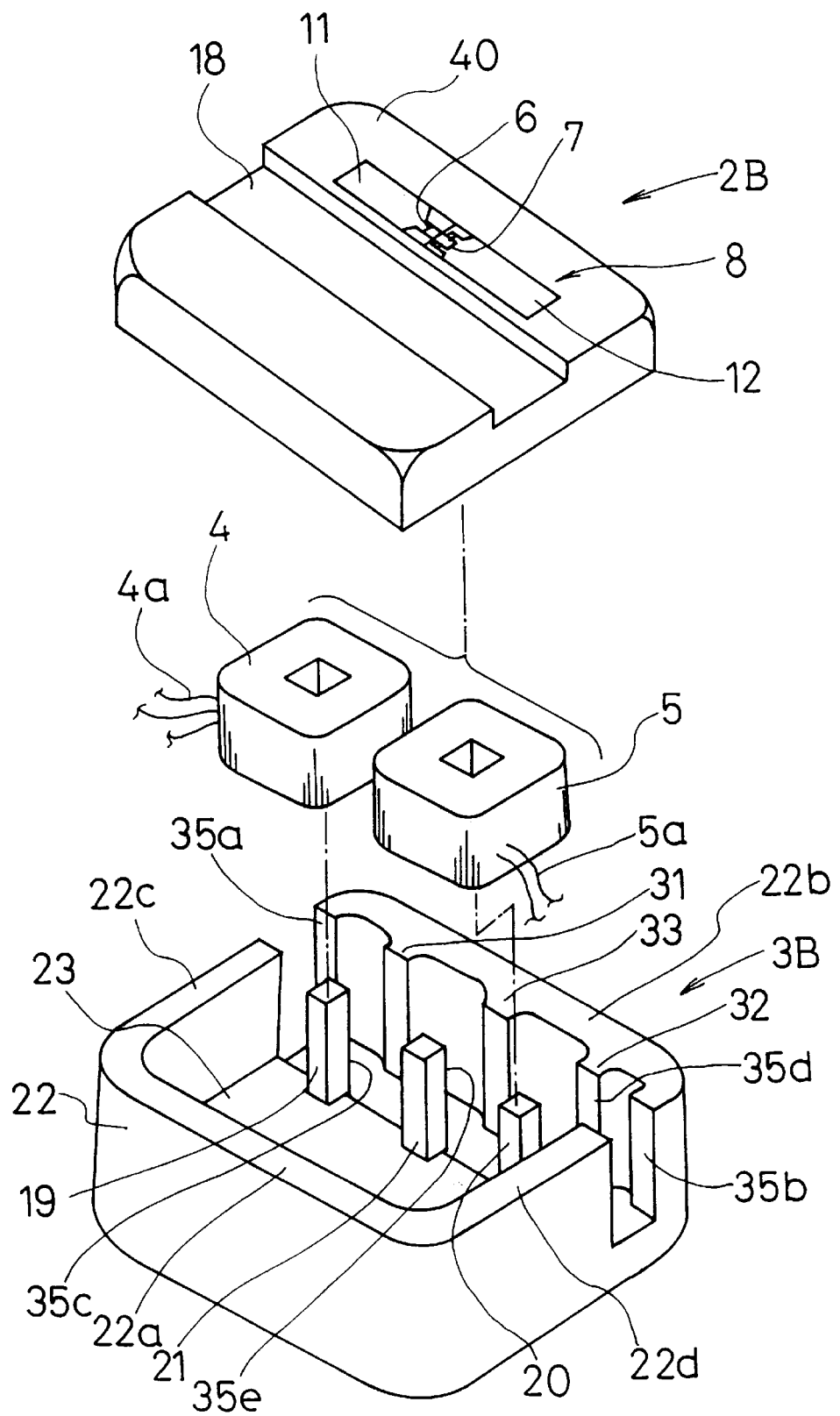
FIG. 4 is an exploded perspective view showing a magnetic head in accordance with a second embodiment of the present invention.
Figure 5:
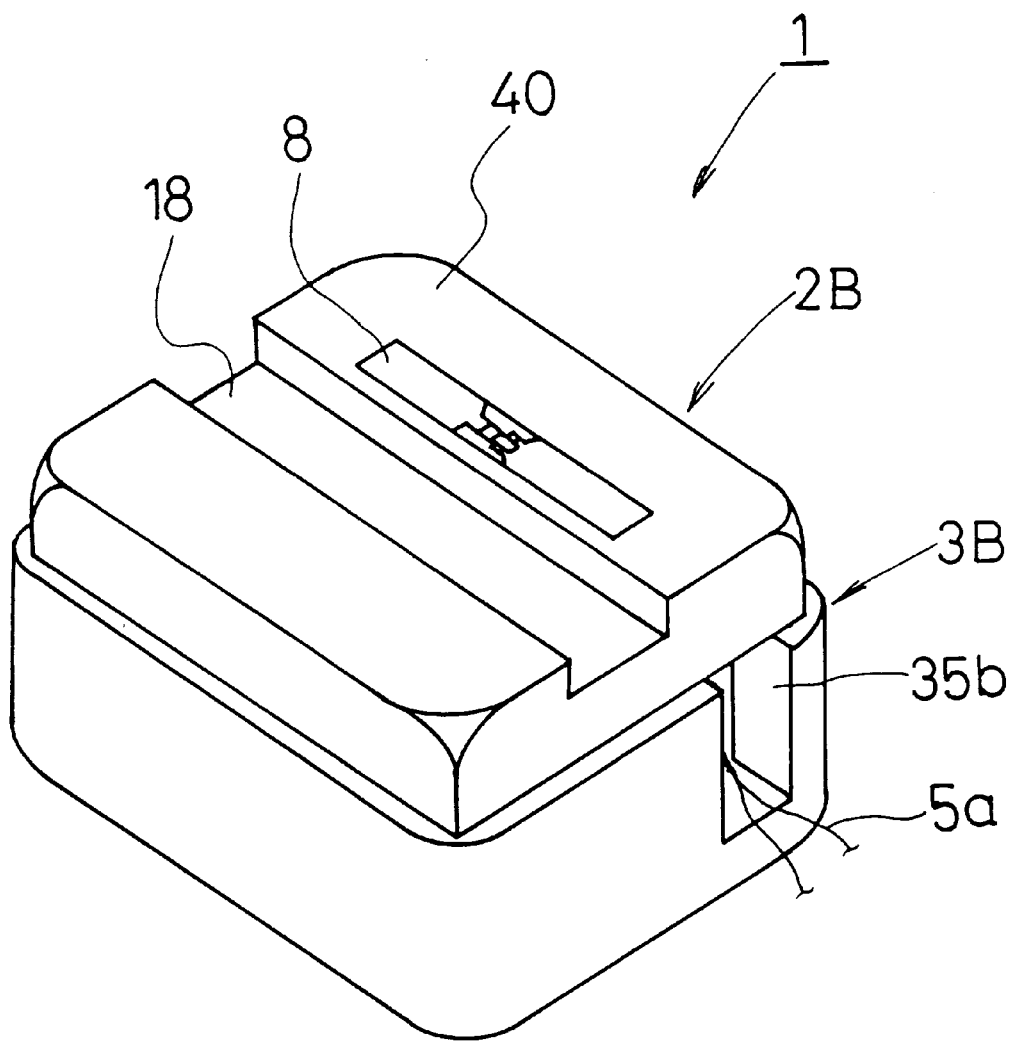
FIG. 5 is a perspective view showing an assembled state of the magnetic head shown in FIG. 4.

A magnetic head 1 described in a second embodiment of the present invention will now be described with reference to FIGS. 4 and 5 in which the same reference numerals as those in FIGS. 1 to 3 and 6 are used to indicate the like components and members and duplicated explanation therefor will be omitted appropriately.

The difference in comparison with the magnetic head 1 described in the first embodiment is that a front core 2B which is of the different type from the front core 2 is provided instead of the front core 2. The other differences are that the elongated first, second and third ribs 31, 32 and 33 extending from the second side wall portion 22b toward the first side wall portion 22a of the closure member 22 are formed in molding, then, the first, second and third leg portions 19, 20 and 21 are obtained from the first, second and third ribs 31, 32 and 33, and a back yoke 3B which has a shorter width than that of the back yoke 3A and a plan shape which is substantially the same as that of the front core 2B is provided instead of the back yoke 3A.

The front core 2B is mainly composed of a core body (slider) 40 having a substantially rectangular shape, slidable to the magnetic recording medium on one side and having a groove 18 on the same side, and a composite core 8 coupled integrally with the core body 40 and fitted in a hole (not identified by numeral) formed in the core body 40 along the groove 18.

Since, in the magnetic head 1 of this type, the front core 2B has substantially the same outer dimension as that of the closure member 22 provided in the back yoke 3B, when the front core 2b and the back yoke 3B are bonded together, the read-write coil 4 and the erasing coil 5 are covered by the front core 2B and the closure member 22. For this reason, the exposure of the read-write coil 4 and the erasing coil 5 may be restricted to suppress the invasion of dust or the like during the sliding operation. For this reason, it is possible to eliminate a risk that the read-write coil 4 and the erasing coil 5 would be subjected to insulation failure or electrical discontinuity.

In the foregoing embodiments, there are two operational gaps, and according to this, there is provided the magnetic head of three leg portion type. However, the present invention is not limited to these embodiments herein. The invention may be applied to the magnetic head, the type of which a single operational gap is provided and the two leg portions are formed by omitting the leg portion corresponding to the common magnetic circuit.

According to a first aspect of the invention, since the magnetic head is constructed as described above, the structure of which the lead lines of the coils are extracted through the cutaways formed in the closure member, it is possible to dispense with a gap formed on the bottom side of the back yoke that would be required for extracting the lead lines in the prior art. For this reason, it is possible to simplify the structure of the back yoke during the molding operation not only to enhance the dimension precision but also to avoid the inflow of the magnetic field through the gap from the outside. To this extent, it is possible to reduce the adverse affect of the external magnetic field.

According to a second aspect of the invention, as described above, there is provided a method for producing the magnetic head thus constructed. In this method, the leg portions are obtained from the elongated ribs extending from the first side wall portion toward the second side wall portion of the closure member during the molding operation. And, the ribs having a broader width, the warpage or deformation on sintering or molding can be prevented. Thus, it is possible to increase the height of the ribs and the leg portions. This enables to obtain the high reproduction output as desired by increasing the number of turns of the coils. Furthermore, since the deformation or warpage would hardly occur during the molding or sintering operation, it is possible to reduce the amount of the binder to be contained and to increase the rate of the magnetic material during the molding. It is therefore possible toreduce the magnetic reluctance to enhance the magnetic characteristics therefor.

Furthermore, since the leg portions are manufactured by machine working to the back yoke base formed by molding, it is possible to enhance the dimension precision in comparison with the leg portions that have been obtained only by molding. This leads to reduction of the clearance between the leg portions and the coils.

Furthermore, in the magnetic head made by this method, it is possible to extract the lead lines of the coils through the cutaways formed in the closure member. It is therefore possible to dispense with the gap formed on the bottom side of the back yoke that has been required for extracting the lead lines in the prior art. For this reason, it is possible to simplify the structure of the back yoke during the molding operation not only to enhance the dimension precision but also to restrict the inflow of the magnetic field through the gap from the outside. Thus, it is possible to reduce the adverse affect of the external magnetic field.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method of fabricating a back yoke for a magnetic head, the back yoke including a generally rectangularly shaped base plate having a flat base plate surface, a closure member including four sidewall portions, a plurality of shortened ribs and a plurality of leg portions with each one of the leg portions associated with a respective one of the plurality of shortened ribs, the closure member connected to the base plate with the four sidewall portions connected to each other and projecting from and substantially circumferentially about a periphery of the base plate to form a cavity as defined by the flat base plate surface and an inner surface of the closure member, the closure member including at least one gap formed between facially opposing wall surfaces of a selected one of the sidewall portions, the cavity being in communication exteriorly of the body member through the at least one gap, the plurality of shortened ribs disposed within the cavity and connected to the base plate and a remaining one of the sidewall portions, each of the plurality of shortened ribs extending from the remaining one of the sidewall portions in a spaced apart parallel relationship with respect to one another along a respective rib axis, the plurality of leg portions connected to the base plate, disposed within the cavity in a spaced apart relationship relative to each other and aligned along a central axis with each leg portion of the plurality of leg portions spaced apart from a respective one of the plurality of shortened ribs along a respective one of the rib axes, the central axis crisscrossing the rib axes substantially perpendicularly, the method comprising the steps of:

mixing a particle-textured Mn—Zn ferrite or Ni—Zn ferrite with an organic binder to form a mixture;

pressuring the mixture in a mold to mold the back yoke having a plurality of extended ribs, each of the plurality of extended ribs including a connecting section connecting a respective one of the plurality of shortened ribs and a respective associated one of the plurality of leg portions;

vaporizing the organic binder contained in the back yoke by heat treatment in a high-temperature furnace at a predetermined pressure;

sintering the Mn—Zn ferrite or the Ni—Zn ferrite; and removing the connecting section of each of the plurality of extended ribs.

* * * * *